United States Patent [19]
Ryan, Jr.

[11] 3,853,858
[45] Dec. 10, 1974

[54] PYRROLOQUINAZOLINE DERIVATIVES
[75] Inventor: Richard P. Ryan, Jr., Evansville, Ind.
[73] Assignee: Mead Johnson & Company, Evansville, Ind.
[22] Filed: June 21, 1973
[21] Appl. No.: 372,131

[52] U.S. Cl. .......... 260/240 E, 424/251, 260/288 R
[51] Int. Cl. ............................................. C07d 51/48
[58] Field of Search ................................ 260/240 E

[56] References Cited
FOREIGN PATENTS OR APPLICATIONS
1,031,745   6/1966   Great Britain .................. 260/240 E OTHER PUBLICATIONS
Moehrle, Tetrahedron Letters, 1970, No. 12, pages 997–998.

Primary Examiner—John D. Randolph
Attorney, Agent, or Firm—Robert H. Uloth; Robert E. Carnahan

[57] ABSTRACT

A novel rearrangement of 1,2-dihydro-2-(3-indolyl)-1-[2-(1-pyrrolinyl)]quinolines provide 9-(3-indolylvinyl)-1,2,3,9-tetrahydropyrrolo[2,1-b]quinazolines which have utility as anti-thrombogenic and/or anti-inflammatory agents. The pyrroloquinazolines are also useful as intermediates in view of their capability of being converted into 3-(indolylethyl)pyrroloquinazolines which have diuretic properties and quaternary indolylvinylpyrroloquinazolines which have anti-inflammatory properties.

9 Claims, No Drawings

PYRROLOQUINAZOLINE DERIVATIVES

BACKGROUND OF THE INVENTION

This invention pertains to heterocyclic carbon compounds having drug and bio-affecting properties. In particular, this invention relates to pyrroloquinazolines derivatives incorporating an indolylvinyl or an indolylethyl substituent. The pyrroloquinazoline vinylindolyl derivatives are useful for their pharmacological activity and as intermediates in view of their capability of being converted into other pharmacologically active agents.

SUMMARY OF THE INVENTION

This invention is concerned with pyrroloquinazoline derivatives and is particularly directed to indolylvinylpyrroloquinazoline compounds corresponding to Formula I

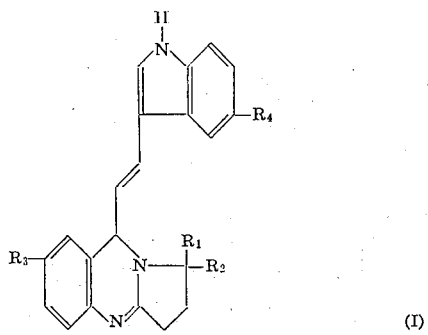

(I)

In the above formula, $R_1$ and $R_2$ are independently selected from hydrogen or lower alkyl and the symbols $R_3$ and $R_4$ represent hydrogen or lower alkoxy.

The terms "lower alkyl" and "lower alkoxy" as used herein connote carbon chains comprised of both straight and branched chain carbon radicals of 1 to 4 carbon atoms inclusive. Exemplary of these carbon chain radicals are methyl, ethyl, propyl, isopropyl, 1-butyl, 1-methylpropyl, 2-methylpropyl and tert.-butyl.

In view of the presence of at least one asymmetric carbon atoms, the compounds of Formula I exist in stereoisomeric modifications and it is to be understood that all stereoisomeric forms are within the purview of this invention.

Compounds of this invention characterized by Formula I are obtained by a rearrangement method which comprises heating 1,2-dihydro-2-(3-indolyl)-1-[2-(1-pyrrolinyl)]quinolines of Formula II wherein $R_1$, $R_2$, $R_3$ and $R_4$ are as previously described in an inert reaction solvent.

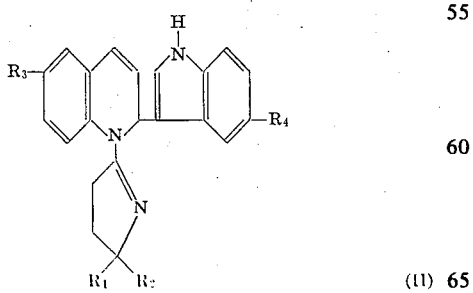

(II)

The rearrangement can be acid or base catalyzed if desired and is preferably carried out by heating a quinoline of Formula II with an alkali metal hydroxide such as potassium hydroxide in an inert reaction solvent such as ethanol at a temperature of about 50° to 100°C. for a period of about 1 to 6 hours.

Quinoline starting materials of Formula II and method for preparation thereof are disclosed in U.S. patent application Ser. No. 306,065.

The indolylvinylpyrroloquinazoline products of the present invention corresponding to Formula I are useful antithrombogenic agents as indicated by prevention of blood platelet aggregation and/or as anti-inflammatory agents.

In addition to the above-stated utility, compounds of Formula I are also valuable as starting materials in the preparation of other useful products of the present invention. For instance, catalytic reduction, employing a platinum oxide catalyst, hydrogenates the olefinic bond of the compounds of Formula I to provide the corresponding compounds of Formula III

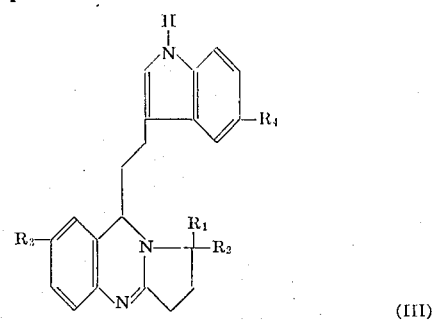

(III)

Typical of this transformation is the reduction of 1,2-dihydro-2-(3-indolyl)-1-[2-(5,5-dimethyl-1-pyrrolinyl)]quinoline to 9-[2-(3-indolyl)ethyl]-1,1-dimethyl-1,2,3,9-tetrahydropyrrolo[2,1-b]-quinazoline which has diuretic properties. Further, alkylation of the compounds of Formula I with methyl iodide provide the corresponding novel quaternary compounds of Formula IV

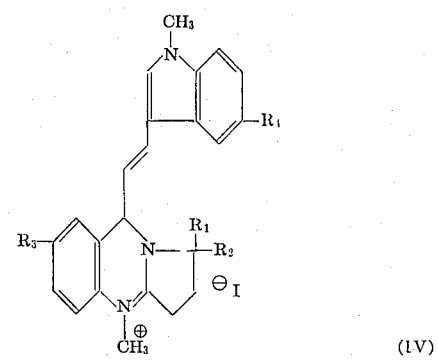

(IV)

Typical of this transformation is the alkylation of 1,2-dihydro-2-(3-indolyl)-1-[2-(5,5-dimethyl-1-pyrrolinyl)]quinoline to 1,1-dimethyl-4-methyl-9-[2-(1-methyl-3-indolyl)vinyl]-1,2,3,9-tetrahydropyrrolo[2,1-b]quinazolinium iodide which has anti-inflammatory properties.

In connection with the "NMR" data given below, chemical shift delta values are in parts per million and the following multiplicity notations employed: s = singlet, d = doublet, t = triplet, m = multiplet (center), bs = broad singlet, dd = doublet of doublets (J values listed). TMS (tetramethylsilane) internal reference was employed for all solvents: DMSO-$d_6$ (deuterated dimethylsulfoxide), CDCl$_3$ (deuterated chloroform), C$_5$D$_5$N (deuterated pyridine).

The following examples will serve to typify the nature of the present invention but should not be construed as a limitation on the scope thereof.

EXAMPLE 1

A mixture of 1,2-dihydro-2-(3-indolyl)-1-(5,5-dimethyl-1-pyrrolin-2-yl)quinoline hydrochloride (6.0 g., 0.0159 mole) m.p. 199°–203°C., and 30 ml. of 56 percent potassium hydroxide in 300 ml. of 95 percent ethanol is refluxed for a period of 3 hr. with stirring during which time a precipitate forms. The reaction mixture is chilled, filtered and the filter-cake air dried affording the product in 80 percent yield. Analytically pure 1,2,3,9-TETRAHYDRO-9-[2-(3-INDOLYL)VINYL]-1,1-DIMETHYL-PYRROLO[2,1-b]QUINAZOLINE, m.p. 270°–270.5°C. (dec.)(corr.) is obtained by crystallization from ethanol.

Analysis. Calcd. for $C_{23}H_{23}N_3$ (percent): C, 80.90; H, 6.79; N, 12.31. Found (percent): C, 81.13, H, 6.93; N, 12.15.

NMR (DMSO-$d_6$, TMS reference): 1.34s, 1.83m, 2.55m, 5.45d (8.3 Hz), 6.17dd (8.3, 15.9 Hz), 7.26m.

EXAMPLE 2

Treatment of 1,2-dihydro-2-(3-indolyl)-1-(5-methyl-1-pyrrolin-2-yl)quinoline with potassium hydroxide according to Example 1 affords an 80 percent yield of 1,-2,3,9-TETRAHYDRO-9-[2-(3-INDOLYL)VINYL]-1-METHYLPYRROLO[2,1-b]QUINAZOLINE, m.p. 229.5°–231.5°C. (dec.) (corr.), from ethanol.

Analysis. Calcd. for $C_{22}H_{21}N_3$ (percent): C, 80.70; H, 6.47; N, 12.83. Found (percent): C, 80.76; H, 6.44; N, 13.00.

NMR ($C_5D_5N$, TMS reference): 1.13d (6.1 Hz), 1.24d (6.1 Hz), 1.65m, 2.65m, 3.68m, 5.41d (8.4 Hz), 5.47d (8.4 Hz), 6.52dd (8.4, 16.2 Hz), 7.37m, 8.08m, 12.35bs.

EXAMPLE 3

Treatment of 1-(5,5-dimethyl-1-pyrrolin-2-yl)-1,2-dihydro-6-methoxy-2-(5-methoxy-3-indolyl)quinoline hydrochloride with potassium hydroxide according to the procedure of Example 1 affords a 14 percent yield of 1,2,3,9-TETRAHYDRO-7-METHOXY-9-[2-(5-METHOXY-3-INDOLYL)-VINYL]-1,1-DIMETHYL-PYRROLO[2,1-b]QUINAZOLINE, m.p. 244.5°–245.5°C. (dec.) (corr.), from absolute ethanol.

Analysis. Calcd. for $C_{25}H_{27}N_3O_2$ (percent): C, 74.78; H, 6.78; N, 10.47. Found (percent): C, 74.58; H, 6.83; N, 10.49.

NMR (DMSO-$d_6$, TMS reference): 1.52s, 2.11t (7.5 Hz), 3.17m, 3.77s, 3.83s, 5.82d (8.5 Hz), 6.27dd (8.5, 15.6 Hz), 7.21m.

EXAMPLE 4

Treatment of 1,2-dihydro-2-(3-indolyl)-1-(1-pyrrolin-2-yl)quinoline with potassium hydroxide according to the procedure of Example 1 affords a 72 percent yield of 1,2,3,9-TETRAHYDRO-9-[2-(3-INDOLYL)VINYL]PYRROLO[2,1-b]QUINAZOLINE, m.p. 228.5°–232°C. (dec.) (corr.), from chloroform.

Analysis. Calcd. for $C_{21}H_{19}N_3$ (percent): C, 80.48; H, 6.11; N, 13.41. Found (percent): C, 80.44; H, 5.84; N, 13.44.

NMR (DMSO-$d_6$, TMS reference): 1.94m, 2.66m, 3.45m, 5.29d (8.3 Hz), 6.14dd (8.3, 15.6 Hz), 6.89d (15.6 Hz), 7.18m, 11.10bs.

EXAMPLE 5

Treatment of 1,2-dihydro-6-methoxy-2-(5-methoxy-3-indolyl)-1-(methyl-1-pyrrolin-2-yl)quinoline with potassium hydroxide according to the procedure of Example 1 affords a 7 percent yield of 1,2,3,9-TETRAHYDRO-7-METHOXY-9-9[(5-METHOXY-3-INDOLYL)VINYL]-1-METHYLPYRROLO-[2,1-b]QUINAZOLINE, m.p. 207.5°–209.5°C. (corr.), from absolute ethanol.

Analysis. Calcd. for $C_{24}H_{25}N_3O_2$ (percent): C, 74.39; H, 6.50; N, 10.85. Found (percent): C, 74.67; H, 6.60; N, 10.92.

NMR (DMSO-$d_6$, TMS reference): 1.23d (6.5 Hz), 1.25d (6.5 Hz), 1.87m, 2.42m, 3.67m, 3.66s, 3.69s, 3.79s, 5.29d (8.5 Hz), 5.34d (8.5 Hz), 6.08m, 7.13m, 11.17bs.

EXAMPLE 6

Treatment of 1,2-dihydro-2-(3-indolyl)-6-methoxy-1-(5,5-dimethyl-1-pyrrolin-2-yl)quinoline hydrochloride with potassium hydroxide according to the procedure of Example 1 affords a 5 percent yield of 1,2,3,9-TETRAHYDRO-9-[2-(3-INDOLYL)VINYL]-7-METHOXY-1,1-DIMETHYLPYRROLO-[2,1-b]QUINAZOLINE, m.p. 237.5°–238.5°C. (dec.)-(corr.), from absolute ethanol.

Analysis. Calcd. for $C_{24}H_{25}N_3O$ (percent): C, 77.60; H, 6.78; N, 11.31. Found (percent): C, 77.60; H, 6.56; N, 11.37.

NMR (DMSO-$d_6$, TMS reference): 1.32s, 1.78m, 2.52m, 3.66s, 5.39d (8.3 Hz), 6.13dd (8.3, 16.1 Hz), 7.20m, 11.25bs.

EXAMPLE 7

1,2,3,9-Tetrahydro-9-[2-(3-indolyl)vinyl]-1,1-dimethylpyrrolo[2,1-b]quinazoline (2.5 g., 7.35 mmole) in 100 ml. of acetic acid is hydrogenated under 45 pounds per square inch hydrogen atmosphere employing 0.2 g. platinum oxide catalyst. When the theoretical amount of hydrogen has been consummed, the mixture is filtered and the acetic acid removed under reduced pressure. The residual red oil thus obtained is partitioned between aqueous ammonium hydroxide and chloroform. The chloroform fraction is separated and concentrated affording a residual oil which on trituration with isopropyl ether solidifies. Crystallization of this material from isopropyl alcohol affords a 44 percent yield of analytically pure 9-[2-(3-INDOLYL)ETHYL]-1,1-DIMETHYL-1,2,3,9-TETRAHYDROPYRROLO[2,1-b]QUINAZOLINE, m.p. 256.5°–259.5°C. (dec.)(corr.).

Analysis. Calcd. for $C_{23}H_{25}N_3$ (percent): C, 80.43; H, 7.34; N, 12.23. Found (percent): C, 80.29; H, 7.36; N, 11.94.

NMR ($CDCl_3$, TMS reference): 1.24s, 1.40s, 1.82t (7.6 Hz), 2.16m, 2.63m, 4.79t (4.2 Hz), 7.04m, 8.58bs.

EXAMPLE 8

1,2,3,9-Tetrahydro-9-[2-(3-indolyl)vinyl]-1,1-dimethylpyrrolo[2,1-b]quinazoline (5.0 g., 14.6 mmole) and sodium hydride (0.7 g., of 57 percent oil dispersion) is stirred in 100 ml. of dry dimethylformamide under a nitrogen atmosphere for a period of 3 hr. at room temperature. Methyl iodide (4.25 g.) in 25 ml. of dry dimethylformamide is then added dropwise to this mixture and stirring continued overnight. Insolubles are collected and the filtrate diluted with isopropyl ether precipitates an oil which on stirring with isopropyl alcohol solidifies. Crystallization of the solidified oil from absolute ethanol affords a 29 percent yield of analytically pure 1,1-DIMETHYL-4-METHYL-9-[2-(1-METHYL-3-INDOLYL)VINYL]-1,2,3,9-TETRAHYDROPYRROLO[2,1-b]QUINAZOLINIUM IODIDE HEMIETHANOLATE, m.p. 250.0–252.5°C. (dec.)-(corr.).

Analysis. Calcd. for $C_{25}H_{28}N_3I \cdot 1/2 C_2H_6O$ (percent): C, 60.23; H, 5.64; N, 8.11. Found (percent): C, 59.84; H, 5.96; N, 8.23.

NMR (DMSO-$d_6$, TMS reference): 1.50s, 2.10t (7.5 Hz), 3.35m, 3.53s, 3.71s, 5.83d (8.4 Hz), 6.23dd (8.4, 15.2 Hz), 7.32m.

What is claimed:

1. A pyrroloquinazoline derivative selected from the group consisting of compounds of the formula

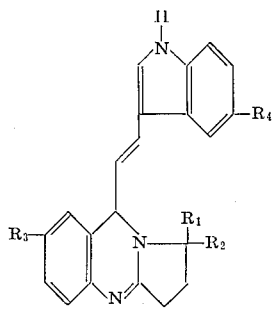

wherein $R_1$ and $R_2$ are independently selected from hydrogen or lower alkyl of 1 to 4 carbon atoms inclusive; and $R_3$ and $R_4$ are independently selected from hydrogen or lower alkoxy of from 1 to 4 carbon atoms inclusive.

2. A compound according to claim 1 consisting of 1,1-dimethyl-9-(3-indolylvinyl)-1,2,3,9-tetrahydropyrrolo[2,1-b]quinazoline.

3. A compound according to claim 1 consisting of 9-(3-indolylvinyl)-1-methyl-1,2,3,9-tetrahydropyrrolo[2,1-b]quinazoline.

4. A compound according to claim 1 consisting of 1,1-dimethyl-9-[3-(5-methoxyindolylvinyl)]-7-methoxy-1,2,3,9-tetrahydropyrrolo[2,1-b]-quinazoline.

5. A compound according to claim 1 consisting of 9-(3-indolylvinyl)-1,2,3,9-tetrahydropyrrolo[2,1-b]quinazoline.

6. A compound according to claim 1 consisting of 9-[3-(5-methoxyindolylvinyl)]-7-methoxy-1,2,3,9-tetrahydropyrrolo[2,1-b]-quinazoline.

7. A compound according to claim 1 consisting of 1,1-dimethyl-9-(3-indolylvinyl)-7-methoxy-1,2,3,9-tetrahydropyrrolo[2,1-b]-quinazoline.

8. 9-[2-(3-Indolyl)ethyl]-1,1-dimethyl-1,2,3,9-tetrahydropyrrolo[2,1-b]quinazoline.

9. 1,1-Dimethyl-4-methyl-9-[2-(1-methyl-3-indolyl)vinyl]-1,2,3,9-tetrahydropyrrolo[2,1-b]quinazolinium iodide.

* * * * *